(12) United States Patent
Song et al.

(10) Patent No.: US 8,501,366 B1
(45) Date of Patent: Aug. 6, 2013

(54) NANOENGINEERED MEMBRANE ELECTRODE ASSEMBLY INTERFACE

(75) Inventors: Yujiang Song, Albuquerque, NM (US); John A. Shelnutt, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 431 days.

(21) Appl. No.: 12/487,391

(22) Filed: Jun. 18, 2009

Related U.S. Application Data

(60) Provisional application No. 61/076,713, filed on Jun. 30, 2008.

(51) Int. Cl.
*H01M 8/10* (2006.01)

(52) U.S. Cl.
USPC .......................................................... 429/483

(58) Field of Classification Search
USPC ................................................. 429/523, 483
See application file for complete search history.

(56) References Cited

U.S. PATENT DOCUMENTS

| | | | |
|---|---|---|---|
| 4,959,132 A | 9/1990 | Fedkiw, Jr. | |
| 5,861,222 A | 1/1999 | Fischer et al. | |
| 6,156,449 A | 12/2000 | Zuber et al. | |
| 6,403,245 B1 | 6/2002 | Hunt | |
| 6,627,048 B1* | 9/2003 | Shelnutt et al. | 204/157.75 |
| 6,673,127 B1 | 1/2004 | Allen et al. | |
| 7,374,599 B1 | 5/2008 | Shelnutt et al. | |
| 7,419,740 B2 | 9/2008 | Binder et al. | |
| 2005/0181252 A1 | 8/2005 | Risen, Jr. et al. | |
| 2006/0251953 A1* | 11/2006 | Li et al. | 429/44 |
| 2007/0231674 A1 | 10/2007 | Shelnutt et al. | |
| 2008/0070777 A1* | 3/2008 | Jang et al. | 502/101 |
| 2009/0011928 A1 | 1/2009 | Nwoga et al. | |
| 2009/0053561 A1* | 2/2009 | Jiang et al. | 429/12 |

OTHER PUBLICATIONS

Yusuke Ayato et al, "Study of Pt Electrode/Nafion Ionomer Interface in HClO$_4$ by in Situ Surface-Enhanced FTIR Spectroscopy", Journal of the Electrochemical Society, 2006, vol. 153, No. 2, pp. A203-A209.

Hai Sun, et al, "Pd electroless plated Nafion membrane for high concentration DMFCs", Journal of Membrane Science, vol. 259, 2005, pp. 27-33.

Raymond Liu et al, "In Situ Electrode Formation on a Nafion Membrane by Chemical Platinization", Journal of the Electrochemical Society, vol. 139, No. 1, Jan. 1992, pp. 15.

P. Millet et al, "Precipitation of Metallic Platinum into Nafion Ionomer Membranes", Journal of the Electrochemical Society, vol. 140, No. 5, May 1993, pp. 1373-.

(Continued)

*Primary Examiner* — Patrick Ryan
*Assistant Examiner* — Lucas J O Donnell
(74) *Attorney, Agent, or Firm* — Carol I. Ashby; Kevin W. Bieg

(57) ABSTRACT

A membrane electrode structure suitable for use in a membrane electrode assembly (MEA) that comprises membrane-affixed metal nanoparticles whose formation is controlled by a photochemical process that controls deposition of the metal nanoparticles using a photocatalyst integrated with a polymer electrolyte membrane, such as an ionomer membrane. Impregnation of the polymer membrane with the photocatalyst prior to metal deposition greatly reduces the required amount of metal precursor in the deposition reaction solution by restricting metal reduction substantially to the formation of metal nanoparticles affixed on or near the surface of the polymer membrane with minimal formation of metallic particles not directly associated with the membrane.

27 Claims, 4 Drawing Sheets

OTHER PUBLICATIONS

Mu Pan et al, "Fabrication and Performance of Polymer Electrolyte Fuel Cells by Self-Assembly of Pt Nanoparticles", Journal of the Electrochemical Society, 2005, vol. 152, No. 6, pp. A1081-A1088.

Yujiang Song et al, "Controlled Synthesis of 2-D and 3-D Dendritic Platinum Nanostructures", Journal of the Electrochemical Society, 2004, vol. 126, pp. 635-645.

Haolin Tang et al, "Electrostatic self-assembly Pd particles on Nafion membrane surface to reduce methanol crossover", Chinese Science Bulletin, vol. 50, No. 4, Feb. 2005, pp. 377-379.

Haolin Tang et al, "Self-assembling multi-layer Pd nanoparticles onto Nafion membrane to reduce methanol crossover", Colloids and Surfaces A: Physicochem. Eng Aspects, vol. 262, 2005, pp. 65-70.

S. R. Yoon, et al, "Modification of polymer electrolyte membranes for DMFCs using Pd films formed by sputtering", Journal of Power Sources, vol. 106, 2002, pp. 215-223.

"Dendritic Metal Nanostructures," John A. Shelnutt, Yujiang Song, Eulalia F. Pereira, and Craig J. Medforth, U.S. Appl. No. 11/840,067, filed Aug. 16, 2007.

"Method of Photocatalytic Nanotagging," John A. Shelnutt, Craig J. Medforth, and Yujiang Song, U.S. Appl. No. 11/542,506, filed Oct. 3, 2006.

"Highly Uniform Porous Metallic Nanoshells," Yujiang Song, Haorong Wang, John A. Shelnutt, and Craig Medforth, U.S. Appl. No. 12/147,059, filed Jun. 26, 2008.

* cited by examiner

NANOENGINEERED MEMBRANE ELECTRODE ASSEMBLY INTERFACE

This patent application claims priority benefit from U.S. provisional patent application Ser. No. 61/076,713, filed on Jun. 30, 2008, which is incorporated herein by reference.

The United States Government has rights in this invention pursuant to Department of Energy Contract No. DE-AC04-94AL85000 with Sandia Corporation.

CROSS-REFERENCE TO RELATED APPLICATIONS

This application is related to the following patent and copending applications:

"Dendritic Metal Nanostructures," John A. Shelnutt, Yujiang Song, Eulalia F. Pereira, and Craig J. Medforth, U.S. Pat. No. 7,374,599, issued May 20, 2008, which is incorporated herein by reference.

"Dendritic Metal Nanostructures," John A. Shelnutt, Yujiang Song, Eulalia F. Pereira, and Craig J. Medforth, formerly U.S. patent application Ser. No. 11/840,067, filed Aug. 16, 2007, now U.S. Pat. No. 7,785,391, issued Aug. 31, 2010, which is incorporated herein by reference.

"Method Of Photocatalytic Nanotagging," John A. Shelnutt, Craig J. Medforth, and Yujiang Song, formerly U.S. patent application Ser. No. 11/542,506, filed Oct. 3, 2006, now U.S. Pat. No. 7,704,489, issued Apr. 27, 2010, and divisional U.S. patent application Ser. No. 12/548,745 filed Aug. 27, 2009, which are incorporated herein by reference.

"Highly Uniform Porous Metallic Nanoshells," Yujiang Song, Haorong Wang, John A. Shelnutt, and Craig Medforth, U.S. patent application Ser. No. 12/147,059, filed Jun. 26, 2008, which is incorporated herein by reference.

BACKGROUND OF THE INVENTION

This invention relates to polymer electrolyte membrane (PEM) fuel cells, more specifically it relates to the membrane electrode assembly (MEA). The multilayer assembly of the membrane sandwich that is between the two electrodes is commonly called the MEA. The MEA is sandwiched between the collector/separator plates. Collector plates collect and conduct electrical current. Separator plates separate the gases in adjacent cells in multicell configurations. Separator plates are also called bipolar plates because they physically and electrically connect the cathode of one cell to the anode of the adjacent cell. They provide the pathways for flow of reactant gases and provide the structural rigidity of the cell.

Requirements of a fuel cell membrane include high proton conductivity, the ability to provide an adequate barrier to mixing of fuel and reactant gases, and chemical and mechanical stability. Membranes are often perfluorocarbon-sulfonic acid ionomers, which are co-polymers comprising tetrafluoroethylene and perfluorosulfonate monomers. Nafion is the best known of this family of materials and is a perfluorosulfonylfluoride ethyl-propyl-vinyl ether.

A fuel cell electrode comprises a thin catalyst layer between the ionomer membrane and a porous, electrically conductive substrate. The electrochemical reactions of the fuel cell occur at the catalyst surface. The most common catalyst in PEM fuels cells is Pt, which catalyzes both oxygen reduction and hydrogen oxidation. In early fuel cells, large amounts of Pt were used (up to 28 mg/cm$^2$). In the late 1990s, the use of supported catalysts reduced this to 0.3 to 0.4 mg/cm$^2$. It is desirable to minimize the amount of Pt while maximizing the Pt surface area by using small particles finely dispersed onto the surface of the catalyst support, which is typically a carbon powder (about 40 nm size) with a high mesoporous area (>75 m$^2$/g). One key to improving PEM fuel cell performance is increasing the active Pt surface area.

There are two common ways to prepare the catalyst layer and attach it to the ionomer membrane, thereby forming the MEA. One can deposit the catalyst layer on the porous substrate (the gas diffusion layer), which is typically carbon fiber paper or cloth, then hot-press it to the membrane. Alternatively, one can apply the catalyst directly to the membrane. Current methods of applying catalyst include spreading, spraying, sputtering, painting, screen printing, electrodeposition, evaporative deposition, and impregnation reduction.

An important design consideration is that the catalyst should be simultaneously physically touching all three phases: the membrane (for proton transport), the porous carbon (for electron transport) and the gas (for oxygen transfer) in order to catalyze the oxygen reduction reaction at the cathode. Current construction techniques to provide the desired connections are frequently dependent on methods such as brush-painting or spraying a mixture of carbon-supported Pt and solubilized membrane polymer onto the solid membrane. This approach causes a significant portion of the Pt to lack good contact with the membrane, preventing access to protons, or to be buried in the polymer or carbon, preventing access to oxygen.

Some Pt alloys that are very stable (PtCr, PtZr, and PtTi) can be used in PEMs, but dissolution of the base metal by the perfluorinated sulfonic acid in the electrocatalyst layer and membrane precludes the use of most other catalysts in many fuel cell applications.

BRIEF DESCRIPTION OF THE DRAWINGS

The accompanying drawings, which are incorporated in and form part of the specification, illustrate some embodiments of the present invention and, together with the description, serve to explain the principles of the invention.

FIG. 1 illustrates some embodiments schematically as a distribution of dendritic metal nanoparticles on the surface of an ionomer membrane. In FIG. 1b, photocatalyst is distributed through the membrane without particular dependence on the presence or geometry of pores within the membrane, and metal nanoparticles are affixed to the surface. In FIG. 1c, metal nanoparticles are affixed proximate to the surface exit of some membrane pores while other membrane pores may not have a directly associated metal dendrite. In some embodiments a combination of these two situations may occur. For clarity, the photocatalyst molecules incorporated within the membrane are not shown in this schematic illustration.

FIG. 2 provides an enlarged view of the near-surface region of some embodiments.

FIG. 4 illustrates two embodiments schematically as side views of a membrane electrode assembly.

DETAILED DESCRIPTION OF THE INVENTION

This invention comprises a membrane electrode structure suitable for use in a membrane electrode assembly (MEA) that combines the advantages of reducing the required amounts of metal while achieving improved performance. It reduces metal usage by nanoscale engineering of the membrane-metal interface.

Embodiments of this invention comprise membrane-affixed metal nanoparticles whose formation is controlled by a photochemical process that controls deposition of the metal nanoparticles using a photocatalyst integrated with a polymer electrolyte membrane, such as an ionomer membrane. Impregnation of the polymer membrane with the photocatalyst prior to metal deposition can greatly reduce the required amount of metal precursor in the deposition reaction solution by restricting metal reduction substantially to the formation of metal nanoparticles affixed on or near the surface of the polymer membrane with minimal formation of metallic particles not directly associated with the membrane. For embodiments for use as proton exchange membrane (PEM) electrodes, the polymer of the membrane can be an ionomer that allows transport of protons but generally does not enable ready transport of electrons through the membrane.

In embodiments of this invention, metallic nanoparticles are formed on a photocatalyst-impregnated membrane where photocatalytic metal deposition confines most of the metal substantially at the surface of the membrane and with intimate contact between membrane and metal catalyst. There may be some metal reduced within the body of the membrane, but this fraction of metal is expected to be limited by the ability of the photocatalyst, metal precursor, and electron donor to navigate into the interior of the ionomer membrane and would be expected to be a small amount compared to the nanoparticles at/on the surface. The role of the photocatalyst in the reduction of the metal precursor greatly reduces the amount of precursor that is needed to form high-surface-area metallic catalyst on the membrane surface, as compared to other fabrication processes that do not spatially restrict metal reduction to the regions of the membrane proximate to a photocatalyst.

Figure 1A:
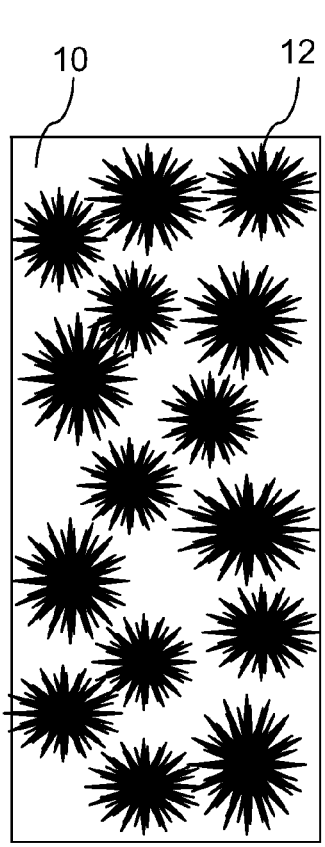
FIG. 1a illustrates schematically the front surface of the membrane, showing a number of metal dendrites distributed upon the surface of the membrane. In various embodiments, the metal nanoparticles can vary in size and shape from relatively smooth to highly dendritic and may be substantially isolated or may be in direct contact with adjacent nanoparticles.
Figure 1B:
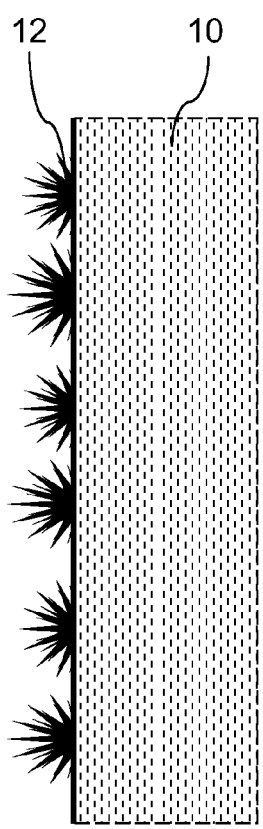
FIGS. 1b and 1c show schematically side views of the surface region of the ionomer membrane.
Figure 1C:
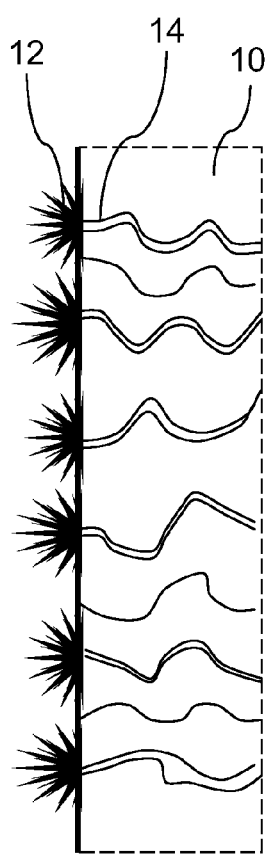

FIGS. 1a, 1b, 1c, 2a, and 2b illustrated schematically some embodiments of the present invention. A top view of a membrane 10 with a distribution of metallic nanoparticles 12 is presented in FIG. 1a. The nanoparticles illustrated in FIG. 1a are dendritic, with a very high surface-to-volume ratio. The metallic nanoparticles can vary in size and shape and may not be substantially dendritic in some embodiments. The nanoparticles can be relatively isolated from each other or can be in direct contact. The size and degree of contact between adjacent nanoparticles can be adjusted and controlled by varying the amount of metal ion precursor present in the reaction solution employed for the nanoparticle growth. The distribution of nanoparticles can also be controlled by the distribution of photocatalyst in the surface region of the membrane. FIG. 1b illustrates an embodiment wherein the photocatalyst molecules are generally distributed within the polymer membrane without particular reference to any extended pore structure that might be present in some types of membranes. Metallic nanoparticles grow affixed to the membrane proximate to photocatalysts in the near-surface region of the membrane. FIG. 1c illustrates an embodiment where the distribution of photocatalyst within the membrane is dominantly influenced by an extended pore structure of the membrane. In such embodiments, the position of the various nanoparticles atop the surface of the membrane will depend on the location of the photocatalyst molecules, which can depend on the position where pores 14 of the membrane open at the membrane surface. Some pore openings may not be associated with nanoparticles. In embodiments where the photocatalyst is largely confined to pores of the membrane, one might expect that some pores may have surfaces openings too small to accommodate entrance of the photocatalyst molecule during the loading process. In various embodiments, the photocatalyst-molecule-loaded membrane can have photocatalyst generally distributed within the polymer, primarily distributed within pores, or some combination of both.

Figure 2B:
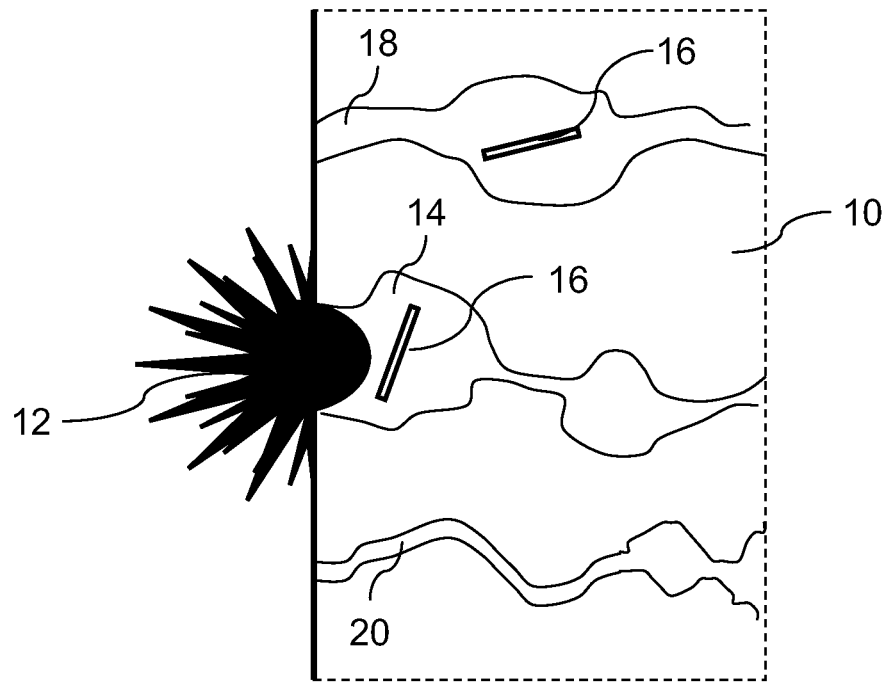
FIG. 2b illustrates one embodiment schematically in side view of the surface region of the loaded membrane (not to scale), showing photocatalyst molecules loaded within some pores of the ionomer membrane. A metal nanodendrite has been grown proximate to the photocatalyst at the entrance of one pore.
Figure 2A:
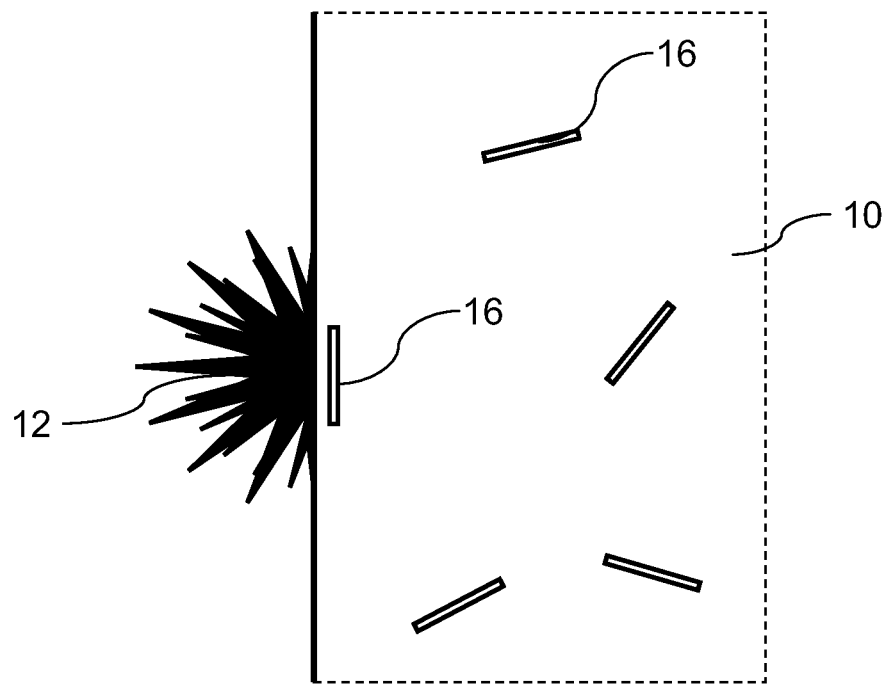
FIG. 2a illustrates an embodiment schematically in side view where the loaded membrane has photocatalyst distributed generally through the membrane and a metal nanoparticle has formed and is affixed to the surface proximate to a near-surface photocatalyst molecule.

FIG. 2a illustrates schematically an enlarged side view of the near-surface region of an embodiment. The photocatalyst molecules 16 are generally distributed throughout the membrane 10. A metallic nanoparticle 12, a dendrite in this illustration, is formed atop the surface of the membrane proximate to a photocatalyst molecule.

FIG. 2b illustrates schematically a side view of an embodiment where a single nanoparticle 12 has formed at the entrance to a pore 14 that contains a photocatalyst molecule 16. Elements of FIGS. 1, 2, and 4 are not necessarily drawn to scale. FIG. 2b illustrates three situations that might occur for different pores of the membrane. Some pores 14 are large enough to accommodate a photocatalyst molecule 16 at a position relative to the surface where electron donor species and metal precursor species can interact with the photoexcited photocatalyst molecule, leading to metal reduction and growth of the nanoparticle 12. Such nanoparticles will be relatively firmly affixed to the membrane surface since a portion of the nanoparticle may be expected in many cases to penetrate somewhat beneath the surface into the pore. This can enhance the mechanical robustness of the structure; such robustness can allow the membrane electrode structure to be rinsed without loss of the metal nanoparticles. For some pores 18, the photocatalyst 16 may penetrate deeper into the membrane where it may not participate as readily in the formation of metal nanoparticles. Some pores 20 may be too small at the surface to admit the photocatalyst molecule. Dendrites would generally not be expected to form at the surface of photocatalyst-free pores. Surface treatments and chemical treatments of the membrane before either photocatalyst loading or before immersion of the photocatalyst-loaded membrane into the reaction solution might be employed to change the pore profiles and therefore distribution of metal dendrites on the membrane surface.

In some embodiments, the membrane/Pt/carbon interface of an MEA is engineered to achieve the most efficient usage of Pt as a fuel cell catalyst. Some embodiments of this invention serve to fabricate the membrane/Pt/carbon interface for each Pt nanoparticle to ensure that they are in contact with the membrane, the porous carbon, and the oxygen-containing gas, thereby making them active in oxygen reduction. To achieve a high Pt loading, the polymer membrane can be roughened to reach a high surface area by physical and/or chemical etching before Pt deposition.

A variety of methods can be employed to load the ion-conductive membrane with photocatalyst molecules. In some embodiments, a layer of photocatalyst is coated upon the membrane via a self-assembly process. For example, a photocatalyst solution employing a volatile solvent can be sprayed onto the surface of the polymer electrolyte membrane. Evaporation of the solvent, with or without additional heating, allows the photocatalyst to self-assemble. In some embodiments, the photocatalyst may be incorporated by placing the membrane in a solution containing the photocatalyst and allowing sufficient time for the catalyst to load itself onto and/or within the membrane before removing the membrane from the solution. Porosity of the membrane allows the photocatalyst to penetrate beneath the surface of the membrane and load the membrane with photocatalyst that can remain affixed on and/or within the membrane when the membrane is removed from the loading solution. This porosity may reflect a relative ease in molecules penetrating interstices between polymer strands comprising the membrane or it may reflect a more developed open pore structure; in either case, photocatalyst molecules can be loaded into the membrane polymer. In various embodiments, a suitable photocatalyst is dissolved in a suitable solvent, such as, for example, ethanol, that does not degrade the membrane material, and the ion-conductive membrane is placed into the photocatalyst-containing solution for loading. For example, in one embodiment, a Nafion membrane is immersed in an ethanol solution of tin octaethylporphyrin (SnOEP). The dissolved porphyrin molecules are transported into the membrane for a time suitable for achieving the desired level of photocatalyst loading. For example, the immersion time may be between 0.5 and 30 minutes, depending on the concentration of porphyrin in the ethanol. Longer or shorter times may also be employed. Other solvents that both dissolve the photocatalyst molecules and yet do not excessively unacceptably degrade the ionomeric properties of the membrane may be used. Examples of some other solvents include short-chain alcohols (for example, methanol and isopropanol) and solvent ketones (for example, acetone and methylethylketone). Water may also be used if the catalyst is water-soluble. The photocatalyst molecule can be at least partially water soluble provided its degree of solubility does not enable excessive extraction of the photocatalyst from the membrane before photocatalytic deposition of the metal nanoparticles can occur. A membrane is considered loaded when the desired amount of photocatalyst has been incorporated; this amount can be less than a saturation amount if a lesser degree of nanoparticle deposition is desired.

When the photocatalyst is a colored material, the loading of the membrane with the photocatalyst molecules is made apparent by the change in color of the loaded membrane as compared with the starting membrane material. After loading, the photocatalyst-loaded membrane can optionally be rinsed with a suitable solvent to remove any unaffixed photocatalyst from the membrane surface that might be released into the metal-deposition solution and possibly cause formation of non-membrane-bound metal nanoparticles. In some embodiments of the process for making the membrane electrode structure, the membrane may be allowed to dry (residual solvent be allowed to evaporate) before proceeding to subsequent steps of the process.

Figure 3:
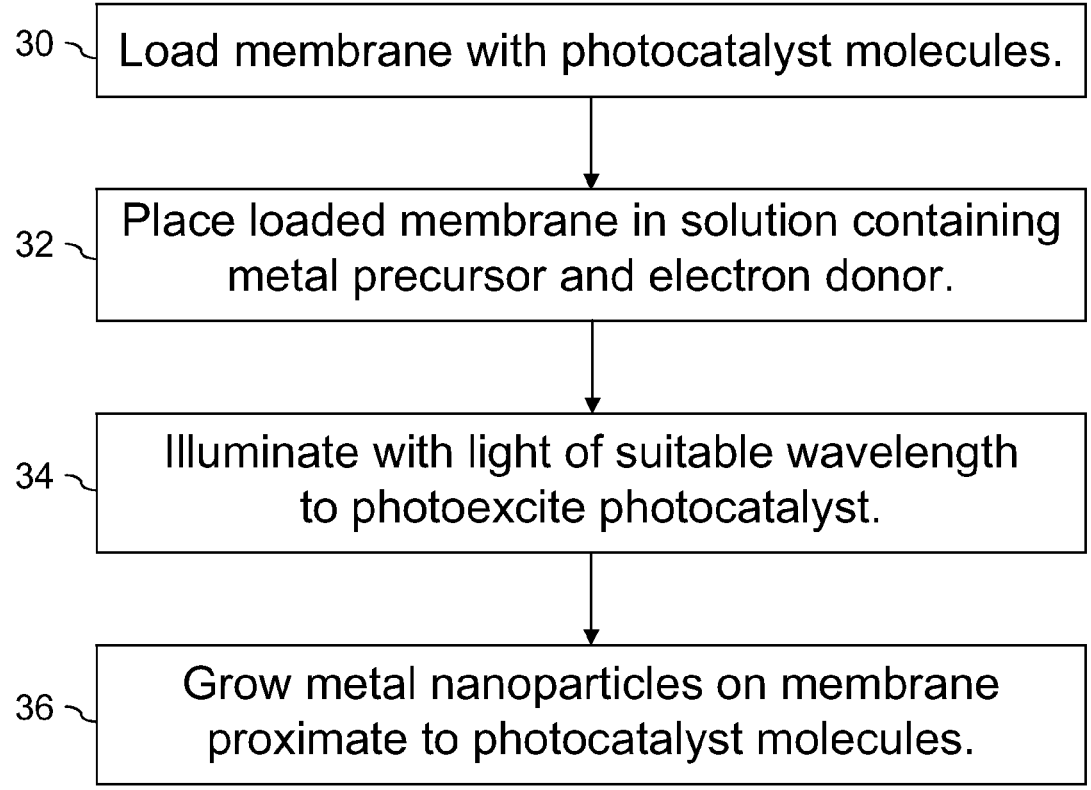
FIG. 3 illustrates one embodiment of a method of making the membrane electrode structure.

In FIG. 3, the method of making one embodiment of the invention is presented schematically. A membrane is loaded 30 with photocatalyst molecules to form a photocatalyst-molecule-loaded ion-conductive membrane. This can be done by immersing the membrane in a solution of the photocatalyst to allow diffusion of the photocatalyst into the membrane, or the photocatalyst can be bound to the membrane surface. A range of different chemical reactions can be used to bind the photocatalyst. For example, the surface of the membrane can be chemically modified to create reactive moieties such as —OH and/or —COOH groups, which can be used to form chemical bonds with photocatalysts with reactive functional groups including but not limited to —$NH_2$ and —OH groups. Selection of suitable funtionalities for the membrane and the photocatalyst is within the skill of a person skilled in the chemical art. The loaded membrane is placed 32 in a reaction solution comprising a metal ion precursor and an electron donor. The photocatalyst-molecule-loaded membrane is irradiated 34 with light of a wavelength suitable to produce an excited photocatalyst molecule. Metal nanoparticles are grown 36 on the membrane proximate to the photocatalyst. This is accomplished by the excited photocatalyst, the electron donor, and the metal ion precursor undergoing reaction to form a reduced metal ion proximate to the photocatalyst molecule. A plurality of the reduced metal ions form the metal nanoparticle that is affixed to the photocatalyst-loaded ion-conductive membrane.

One type of photocatalyst suitable for use in embodiments of this invention is a metalloporphyrin. When Pt is selected as the metal for the nanodendrites, the photocatalyst directs Pt to nucleate and grow almost exclusively on the membrane proximate to a photocatalyst molecule using a photocatalyzed reduction of the Pt source species. In a solution containing an electron donor species and a Pt(II) source, the membrane loaded with photocatalyst is illuminate with light of a wavelength suitable to photoexcite the photocatalyst. The photoexcited photocatalyst reacts with an electron donor species to produce a radical anion, which in turn catalytically reduces the Pt(II) source to form Pt metal proximate to the photocatalyst. A Pt alloy that is stable under fuel cell operating conditions may also be deposited (e.g., PtCr, PtZr, and PtTi). This step forms the connections between the Pt and the membrane for each particle. An advantage of photocatalytic deposition of the Pt is the ability to substantially completely deposit the Pt(II) present in solution onto the membrane as Pt atoms, enabling a minimum amount of Pt(II) species to achieve the desired membrane Pt loading to be used in this part of the process. Pd and its alloys can also be deposited by an analogous process for fuel cell catalytic applications.

Different metals can be deposited for use in fuel cell and other applications. Examples include but are not restricted to Pt, PtCo, PtRu, PtNi, PtFe, PtCr, PtZr, PtTi, PdPt, PtRh, PtIr, Pd, Ni, Cu, Ag, Au, Rh, Ir, Ru, and alloys thereof.

Selection of a compatible combination of photocatalyst, electron donor species, and metal ion precursor can be made by considering the relative chemical potentials of the species and their relevant excited states for the electron transfer processes.

For fuel cell applications of embodiments of this invention, the ion-conductive membrane is a proton-conductive membrane capable of withstanding the relatively high temperatures of an operating fuel cell. Examples of suitable membrane materials are anionic ionomers comprising anions of an acid with a pKa suitable for facilitating proton transport through the anionic ionomer. For other applications, other types of ion-conductive membranes may be desired. Examples of some ion-conductive membranes include but are not restricted to sulfonate-based ionomers, carboxylate-based ionomers, and phosphonate-based ionomers.

In some embodiments, the photocatalyst is a Sn(IV) porphyrin, such as tin(IV) octaethylporphyrin, the Pt ion source is a Pt(II) complex, such as $PtCl_4^{2-}$, or a Pt(IV) complex such as $PtCl_6^{2-}$, and the electron donor species is ascorbic acid, ascorbate, citric acid, citrate, formic acid, formate, oxalic acid, or oxalate.

In various embodiments, the following porphyrins and/or their salts may be used: tin(IV) 2,3,7,8,12,13,17,18-octaethylporphyrin (SnOEP), tin(IV) 5,10,15,20-tetra(4-sulfonatophenyl)porphyrin (SnTPPS4), tin(IV) protoporphyrin (IX) (SnProP), tin(IV) tetra(N-methyl-4-pyridyl)porphyrin (SnNMePyP), tin(IV) uroporphyrin (SnUroP), tin(IV) tetra(4-pyridyl)porphyrin (SnTPyP), tin(IV) tetraphenylporphyrin (SnTPP), tin(IV) tetra(4-carboxyphenyl)porphyrin (SnTCPP), tin(IV) tetrakis(N-octadecyl-r-pyridyl) porphyrin (SnP18), oxo-antimony(V) 2,3,7,8,12,13,17,18-octaethylporphyrin (SbOOEP), oxo-antimony(V) 5,10,15,20-tetra (4-sulfonatophenyl)porphyrin (SbOTPPS4), oxo-antimony (V) protoporphyrin(IX) (SbOProP), oxo-antimony(V) tetra (N-methyl-4-pyridyl)porphyrin (SbONMePyP), oxo-antimony(V) uroporphyrin (SbOUroP), oxo-antimony(V) tetra(4-pyridyl)porphyrin (SbOTPyP), oxo-antimony(V) tetraphenylporphyrin (SbOTPP), oxo-antimony(V) tetra(4-carboxyphenyl)porphyrin (SbOTCPP), oxo-antimony(V) tetrakis(N-octadecyl-r-pyridyl) porphyrin (SbOP18). The preceding abbreviations are understood to include the porphyrin and/or its salts and the chlorin analogs.

Suitable electron donors include but are not restricted to ascorbic acid, ascorbate ion, citric acid, citrate ion, oxalic acid, formic acid, formate ion, oxalate ion, triethanolamine, methanol, and ethanol.

Many Pt complexes are suitable sources of the Pt(II) or Pt(IV) species to be reduced. In some embodiments, $PtCl_4^{2-}$ and $PtCl_6^{2-}$ may be employed. In some embodiments, Pt may be alloyed with another metal. Examples of such alloy include but are not restricted to PtCo, PtRu, PtNi, PtFe, PtCr, PtZr, and PtTi Many Pd complexes are suitable sources of Pd(II) or Pd(IV) species to be reduced; for example, $PdCl_4^{2-}$ and $PdCl_6^{2-}$ may be employed in some embodiments to form Pd nanoparticles and alloys thereof with other metals.

Figure 4A:
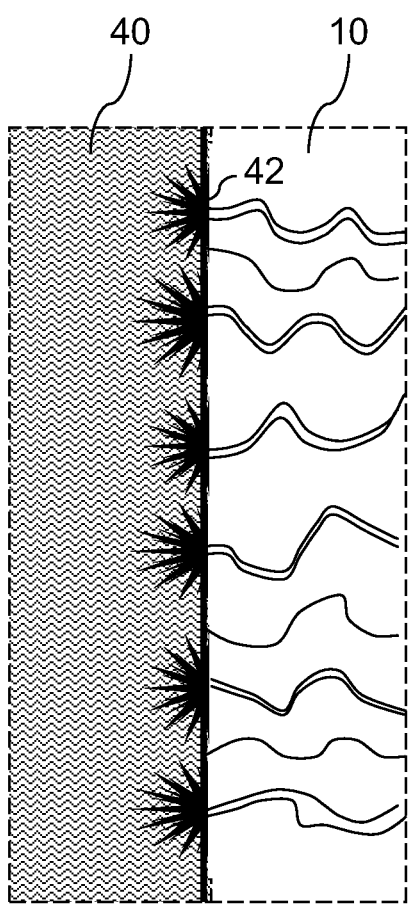
In FIG. 4a, a porous carbon electrode has been formed directly on the surface of the membrane electrode structure comprising an ion-conductive membrane and metal nanostructures.

In some embodiments, porous carbon is applied onto the platinized membrane to provide paths for electrons and transportation channels for gas and water. Many methods of applying carbon to surfaces are known, and many can be used in this process provided adequate reactant access to the catalyst is not excessively blocked. Two such structures are illustrated schematically in FIGS. 4a and 4b. In FIG. 4a, a porous carbon layer 40 is directly deposited on top of the dendritic electrocatalyst 42 by sputtering or chemical vapor deposition. Other methods of direct deposition may also be used, including but not restricted to applying a suspension of carbon particles and removing solvent to form a porous carbon layer. Deposition of the porous gas diffusion layer on the metallic nanoparticles constructs a three-phase boundary for each metallic nanoparticle, which facilitates efficient oxygen reduction and hydrogen oxidation in an operating fuel cell. This enhances the efficiency of usage of the metal catalyst.

Figure 4B:
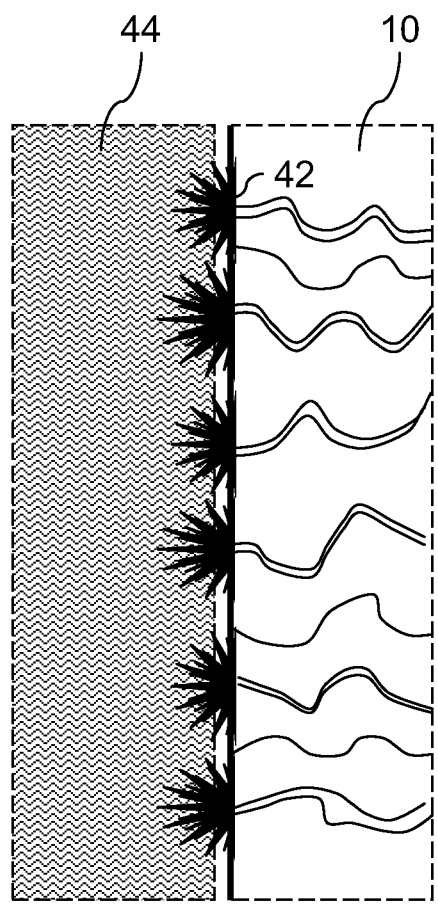
In FIG. 4b, a gas-diffusion layer has been made to contact the metal nanostructures of the membrane electrode structure.

In FIG. 4b, a commercial gas diffusion layer 44 has been made to contact the electrocatalyst 42 by hot-pressing. Alternative methods of pressing the gas diffusion layer into contact with the electrocatalyst can also be employed.

Much of the preceding discussion has been phrased in terms of applications of the membrane electrode structure as part of the membrane electrode assembly of a fuel cell. It is to be understood that embodiments of this invention are also useful for other applications that can use metallic catalyst nanoparticles affixed to a polymer membrane proximate to photocatalyst molecules associated with the membrane. One example of a non-fuel-cell application is hydrogen generation.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A membrane electrode structure comprising:
   a photocatalyst-molecule-loaded ion-conductive membrane;
   a photocatalyst molecule chemically bonded to the photocatalyst-molecule-loaded ion-conductive membrane; and
   a metal nanostructure affixed on or near the surface of the photocatalyst-loaded ion-conductive membrane proximate to the photocatalyst molecule.

2. The membrane electrode structure of claim 1, wherein the metal nanostructure is a dendritic metal nanostructure.

3. The membrane electrode structure of claim 1, wherein a plurality of photocatalyst molecules are dispersed within the photocatalyst-molecule-loaded ion-conductive membrane.

4. The membrane electrode structure of claim 1, wherein a plurality of photocatalyst molecules are affixed to a surface of the photocatalyst-molecule-loaded ion-conductive membrane.

5. The membrane electrode structure of claim 1, wherein the photocatalyst molecule is a metalloporphyrin.

6. The membrane electrode structure of claim 1, wherein the photocatalyst is selected from the group consisting of tin(IV) 2,3,7,8,12,13,17,18-octaethylporphyrin (SnOEP), tin (IV) 5,10,15,20-tetra(4-sulfonatophenyl)porphyrin (SnTPPS4), tin(IV) protoporphyrin(IX) (SnProP), tin(IV) tetra(N-methyl-4-pyridyl)porphyrin (SnNMePyP), tin(IV) uroporphyrin (SnUroP), tin(IV) tetra(4-pyridyl)porphyrin (SnTPyP), tin(IV) tetraphenylporphyrin (SnTPP), tin(IV) tetra(4-carboxyphenyl)porphyrin (SnTCPP), tin(IV) tetrakis (N-octadecyl-r-pyridyl) porphyrin (SnP18), oxo-antimony (V) 2,3,7,8,12,13,17,18-octaethylporphyrin (SbOOEP), oxo-antimony(V) 5,10,15,20-tetra(4-sulfonatophenyl)porphyrin (SbOTPPS4), oxo-antimony(V) protoporphyrin(IX) (SbOProP), oxo-antimony(V) tetra(N-methyl-4-pyridyl)porphyrin (SbONMePyP), oxo-antimony(V) uroporphyrin (SbOUroP), oxo-antimony(V) tetra(4-pyridyl)porphyrin (SbOTPyP), oxo-antimony(V) tetraphenylporphyrin (SbOTPP), oxo-antimony(V) tetra(4-carboxyphenyl)porphyrin (SbOTCPP), oxo-antimony(V) tetrakis(N-octadecyl-r-pyridyl) porphyrin (SbOP18), salts thereof, and chlorin analogs thereof.

7. The membrane electrode structure of claim 1, wherein a membrane material of the photocatalyst-molecule-loaded ion-conductive membrane comprises an anionic ionomer comprising anions of an acid with a pKa suitable for facilitating proton transport through the anionic ionomer.

8. The membrane electrode structure of claim 7, wherein the anionic ionomer is a perfluorocarbon-sulfonic acid ionomers.

9. The membrane electrode structure of claim 7, wherein the membrane material is substantially not electron-conducting.

10. The membrane electrode structure of claim 7, wherein the membrane material is a perfluoro-sulfonylfluoride ethyl-propyl-vinyl ether.

11. The membrane electrode structure of claim 1, wherein the photocatalyst-molecule-loaded ion-conductive membrane comprises an ionomer is selected from a group consisting of sulfonate-based ionomers, carboxylate-based ionomers, and phosphonate-based ionomers.

12. The membrane electrode structure of claim 1, wherein the photocatalyst-molecule-loaded ion-conductive membrane comprises at least one of a sulfonated perfluorinated polymer, a sulfonated polystyrene, a sulfonated random copolymer, a sulfonated block copolymer, an ionic polymer graft copolymerized into a hydrophobic membrane, a sulfonic-acid-containing copolymer; a sulfonated poly(ether ether ketone), a sulfonated poly(ether ether ketone ketone), a sulfonated polyimide, a sulfonated poly(phosphazene), a sulfonated poly(ether sulfone), a sulfonated poly(styrene-b-ethylene-butylene-b-styrene), a sulfonated poly(styrene-b-isobutylene-b-styrene), a sulfonated poly(styrene-b-ethylene) graft copolymer comprising one or more sulfonated polymers, an ionic block copolymer, and a block copolymer comprising one or more sulfonated polymers.

13. The membrane electrode structure of claim 1, wherein the metal nanostructure comprises a metal selected from the group consisting of Pt, PtCo, PtRu, PtNi, PtFe, PtCr, PtZr, PtTi, PdPt, PtRh, PtIr, Pd, Ni, Cu, Ag, Au, Rh, Ir, Ru, and alloys thereof.

14. The membrane electrode structure of claim 1, further comprising an electron-transport layer in contact with a plurality of the metal nanostructures.

15. The membrane electrode structure of claim 14, wherein the electron-transport layer comprises a porous carbon layer.

16. The membrane electrode structure of claim 15, wherein the porous carbon layer is a sputtered porous carbon or a chemical-vapor-deposited porous carbon.

17. The membrane electrode structure of claim 14, wherein the electron-transport layer comprises a gas-diffusion layer.

18. The membrane electrode structure of claim 1, further comprising a porous carbon layer configured to place a plurality of metal nanostructures between the porous carbon layer and the photocatalyst-molecule-loaded ion-conductive membrane.

19. The membrane electrode structure of claim 18, wherein the porous carbon layer comprises at least one of a sputter-deposited carbon layer, a chemical-vapor-deposited carbon layer, and a gas-diffusion layer contactable by hot-pressing.

20. A method for preparing a membrane electrode structure, comprising:
    loading an ion-conductive membrane with a photocatalyst to form a photocatalyst-molecule-loaded ion-conductive membrane;
    immersing the photocatalyst-molecule-loaded ion-conductive membrane in a reaction solution comprising a metal ion precursor and an electron donor;
    illuminating the photocatalyst-molecule-loaded ion-conductive membrane with light of a wavelength suitable to produce an excited photocatalyst molecule;
    reacting the excited photocatalyst molecule with the electron donor and the metal ion precursor to form a reduced metal atom proximate to the excited photocatalyst molecule; and
    combining a plurality of reduced metal atoms to form a metal nanoparticle affixed on or near the surface of the photocatalyst-loaded ion-conductive membrane.

21. The method of claim 20, further comprising applying a porous electron-transport layer to contact a plurality of the metal nanoparticles.

22. The method of claim 20, wherein the step of loading comprises soaking the ion-conductive membrane in a solution of photocatalyst molecules.

23. The method of claim 20, wherein the photocatalyst is selected from the group consisting of tin(IV) 2,3,7,8,12,13,17,18-octaethylporphyrin (SnOEP), tin(IV) 5,10,15,20-tetra(4-sulfonatophenyl)porphyrin (SnTPPS4), tin(IV) protoporphyrin(IX) (SnProP), tin(IV) tetra(N-methyl-4-pyridyl)porphyrin (SnNMePyP), tin(IV) uroporphyrin (SnUroP), tin (IV) tetra(4-pyridyl)porphyrin (SnTPyP), tin(IV) tetraphenylporphyrin (SnTPP), tin(IV) tetra(4-carboxyphenyl)porphyrin (SnTCPP), tin(IV) tetrakis(N-octadecyl-r-pyridyl) porphyrin (SnP18), oxo-antimony(V) 2,3,7,8,12,13,17,18-octaethylporphyrin (SbOOEP), oxo-antimony(V) 5,10,15,20-tetra(4-sulfonatophenyl)porphyrin (SbOTPPS4), oxo-antimony(V) protoporphyrin(IX) (SbOProP), oxo-antimony(V) tetra(N-methyl-4-pyridyl)porphyrin (SbONMePyP), oxo-antimony(V) uroporphyrin (SbOUroP), oxo-antimony(V) tetra(4-pyridyl)porphyrin (SbOTPyP), oxo-antimony(V) tetraphenylporphyrin (SbOTPP), oxo-antimony (V) tetra(4-carboxyphenyl)porphyrin (SbOTCPP), oxo-antimony(V) tetrakis(N-octadecyl-r-pyridyl) porphyrin (SbOP18), salts thereof, and chlorin analogs thereof.

24. The method of claim 20, wherein the photocatalyst-molecule-loaded ion-conductive membrane comprises at least one of a sulfonated perfluorinated polymer, a sulfonated polystyrene, a sulfonated random copolymer, a sulfonated block copolymer, an ionic polymer graft copolymerized into a hydrophobic membrane, a sulfonic-acid-containing copolymer, a sulfonated poly(ether ether ketone) a sulfonated poly (ether ether ketone ketone), a sulfonated polyimide, a sulfonated poly(phosphazene), a sulfonated poly(ether sulfone), a sulfonated poly(styrene-b-ethylene-butylene-b-styrene), a sulfonated poly(styrene-b-isobutylene-b-styrene), a sulfonated poly(styrene-b-ethylene) graft copolymer comprising one or more sulfonated polymers, an ionic block copolymer, and a block copolymer comprising one or more sulfonated polymers.

25. The method of claim 20, wherein the metal ion precursor comprises at least one of Pt, Pd, Ni, Cu, Ag, Au, Rh, Ir, and Ru.

26. The method of claim 20, wherein the electron donor is selected from the group consisting of ascorbic acid, ascorbate ion, citric acid, citrate ion, formic acid, formate ion, oxalic acid, oxalate ion, triethanolamine, methanol, and ethanol.

27. The method of claim 20, further comprising rinsing the photocatalyst-molecule-loaded proton-conductive membrane to remove excess surface photocatalyst molecules prior to immersing in the reaction solution.

\* \* \* \* \*